United States Patent
Kamuf

(10) Patent No.: US 6,662,590 B2
(45) Date of Patent: Dec. 16, 2003

(54) MODULAR FRONT BOX FOR BUSES

(75) Inventor: Klaus Kamuf, St. Leon-Rot (DE)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 09/960,628

(22) Filed: Sep. 21, 2001

(65) Prior Publication Data

US 2002/0121102 A1 Sep. 5, 2002

(30) Foreign Application Priority Data

Sep. 21, 2000 (DE) .......................... 100 46 935

(51) Int. Cl.$^7$ .......................... F25D 17/06; F24H 3/02
(52) U.S. Cl. .......................... 62/428; 62/298; 62/238; 165/54
(58) Field of Search .......................... 62/285, 244, 239, 62/298, 427, 428, 429, 259.1, DIG. 16; 165/50, 53, 54

(56) References Cited

U.S. PATENT DOCUMENTS

| | | | |
|---|---|---|---|
| 3,121,314 A | | 2/1964 | Koyanagi |
| 4,134,275 A | | 1/1979 | Erickson et al. |
| 4,607,497 A | * | 8/1986 | Ferdows et al. ........... 62/259.1 |
| 4,610,146 A | | 9/1986 | Tanemura |
| 4,642,770 A | | 2/1987 | Shirley |
| 4,688,530 A | | 8/1987 | Nishikawa et al. |
| 4,727,728 A | | 3/1988 | Brown |
| 4,748,825 A | | 6/1988 | King |
| 4,787,210 A | | 11/1988 | Brown |
| 4,796,438 A | | 1/1989 | Sato |
| 4,823,555 A | | 4/1989 | Ohkumo |
| 4,885,916 A | | 12/1989 | Arndt |
| 4,888,959 A | | 12/1989 | Brown |
| 4,926,655 A | | 5/1990 | King |
| 5,117,643 A | | 6/1992 | Sakurai et al. |
| 5,163,399 A | | 11/1992 | Bolander et al. |
| 5,167,127 A | | 12/1992 | Ohtsu |
| 5,228,305 A | | 7/1993 | Vogt |
| 5,277,036 A | * | 1/1994 | Dieckmann et al. .......... 62/298 |
| 5,415,004 A | | 5/1995 | Iizuka |
| 5,545,931 A | | 8/1996 | Wang |
| 5,546,755 A | | 8/1996 | Krieger |
| 5,694,781 A | | 12/1997 | Peterson |
| 5,761,917 A | | 6/1998 | Corcoran et al. |
| 5,893,272 A | | 4/1999 | Hanselmann et al. |
| 6,240,742 B1 | * | 6/2001 | Kaufman et al. ............. 165/50 |
| 6,296,284 B1 | | 10/2001 | Weischedel |

FOREIGN PATENT DOCUMENTS

| | | |
|---|---|---|
| CA | 2008665 | 12/1997 |
| CH | 402626 | 5/1966 |
| DE | 3033114 | 3/1982 |
| DE | 19614029 | 10/1996 |
| DE | 19646504 | 5/1998 |
| DE | 19802055 | 7/1999 |

* cited by examiner

Primary Examiner—Chen Wen Jiang
(74) Attorney, Agent, or Firm—Michael Best & Friedrich LLP

(57) ABSTRACT

This invention pertains to a heating and/or air conditioning unit for commercial vehicles and includes two modules. One of the modules houses a heat exchanger unit and another module houses a blower unit. The air conditioning unit also defines an inlet and an outlet for conveying air through the modules. The individual modules are connected together and are relatively air tight. Each of the modules is assembled from a number of wall sections. Edge strips extend along the edges of the modules connecting the modules. The individual wall sections are inserted into the edge strips, which removably couple adjoining modules and the wall sections of individual modules.

20 Claims, 3 Drawing Sheets

MODULAR FRONT BOX FOR BUSES

CROSS-REFERENCE TO RELATED APPLICATIONS

This application claims priority under 35 U.S.C. §1 19 to co-pending German Patent Application No. 100 46 935.3 filed Sep. 21, 2000.

Field of the Invention

This invention pertains to a heating and/or air conditioning unit for commercial vehicles.

BACKGROUND OF THE INVENTION

A vehicle air conditioning unit is a form of temperature control unit, which functions as both a heating unit and a cooling unit for vehicles. These devices are generally capable of heating and, if needed, cooling a commercial vehicle, such as, for example, a bus. The commercial vehicle can, however, also be any other known type, such as, for example, a truck, a semi-trailer tractor, a tractor, a work vehicle (e.g., a construction vehicle, an agricultural vehicle, etc). In some applications, vehicle air conditioning units also heat and/or cool the driver's seat of the commercial vehicle. In these applications, the device can, for example, be incorporated into the design of a vehicle dashboard. Alternatively, the vehicle air conditioning unit can be arranged as an underfloor unit or the vehicle air conditioning unit can be incorporated in the ceiling of the commercial vehicle.

Commercial vehicle air conditioning units are generally more extensive and more voluminous than vehicle air conditioning units used in personal vehicles (e.g., cars, sport utility vehicles, light trucks, and the like) because commercial vehicles generally have larger load spaces and may carry a cargo that must be heated and/or cooled. Commonly, commercial vehicle air conditioning units are manufactured individually or in relatively small batches specific to a particular vehicle or a particular customer's specifications. To reduce costs, commercial vehicle air conditioning units commonly include two or more individual modules, which are assembled from bent sheet metal. The individual modules are generally pre-manufactured and can be assembled in a number of different configurations, depending upon one or more of the customer's specifications, the particular vehicle, space constrains, and the like. Generally, the individual pieces of sheet metal and the adjacent modules are riveted or spot welded together and the adjacent modules are arranged in a linear back-to-back sequence that cannot be disassembled.

SUMMARY OF THE INVENTION

One independent object of the present invention is to simplify maintenance of temperature control units, such as the above-described commercial air conditioning units. Another independent object of the present invention is to improve standardization of individual parts of temperature control units. Yet another independent object of the present invention is to simplify the manufacture of temperature control units. Still another independent object of the present invention is improve certain properties (e.g., corrosion resistance) of the individual elements used in the construction of temperature control units. Another independent object of the present invention is to build modules which can be assembled in a number of different configurations, including rectangular and non-rectangular configurations. In addition to the above-mentioned considerations, the present invention also is intended to accomplish a number of other objectives, which have been omitted for reasons of simplicity and/or brevity, and, in some constructions, may be either more or less desirable than the above-listed objectives.

The present invention provides, among other things, a temperature control unit, such as a commercial air conditioning unit, that accomplishes one or more of the above-identified or other objectives. In some constructions, the invention includes edge strips, which are operable to removably connect two or more modules of a commercial air conditioning unit, allowing the individual modules to be separated and reassembled in the same or a different configuration.

In addition, the modules and the edge strips of the present invention can be assembled quickly and easily during manufacture of the device. The individual elements of the commercial air conditioning unit, including edge strips and wall sections that can be kept in supply and can be used in a number of related applications in relatively small numbers as standard parts, or that can be replaced in case of damage.

Conventional air conditioning units generally include housings that are made of sections of sheet metal which are welded and/or riveted together and are coated with a corrosion-inhibiting layer. In the present invention, the edge strips include a non-conductive intermediate layer, which reduces corrosion caused by materials of different conductivities that contact each other at the joints. In particular, in some constructions of the present invention, the non-conductive intermediate layer is a sealing strip.

The present invention also includes a number of individual modules. In some constructions, one or more of the modules are rectangular modules, which are substantially similar to the modules used in conventional air conditioning units. In other constructions of the present invention, modules with different shapes and configurations, such as, for example, pyramids and the like can be used. In still other constructions, one or more of the modules can be rectangular with one side of the rectangle being bent.

The present invention includes edge strips, which are operable to couple two or more modules together in a number of different configurations. For example, the edge strips can connect two or more modules in a substantially linear configuration. The edge strips of the present invention also provide additional strength and rigidity to the entire air conditioning unit, thereby reducing the stresses experienced by the individual wall sections of the modules so that the wall sections of the modules can be designed to withstand relatively lower stresses. Despite these and other improvements, it is still possible to connect draining units to the present invention and to disassemble the air conditioning units, thereby simplifying maintenance by forming connections.

The edge strips form a number ofjoint connections. For example, in one construction of the present invention, the edge strips include tongues that engage corresponding openings on another part of the air conditioning unit. In other constructions of the present invention, the edge strips include tongues having repositionable protruding ends that are adapted to engage corresponding apertures. To remove the edge strips, the repositionable ends are folded back. However, edge strips with pushed-on connectors are preferred. After the edge strips are assembled, the edge strips can be pulled apart again relatively easily without further manipulation during manufacturing or removal. Edge strips that have pushed-on connectors can include end stops and can, in some constructions of the present invention, provide relatively simple hinged connections for a large portion of the present invention. The edge strips provide an inherently stabile frame for the modules.

In some constructions of the present invention, the end stop includes a molded piece which guides or guarantees the desired spatial arrangement of the assembled parts for joint connections. In other constructions of the present invention, other guiding mechanisms, end stops, and the like can be used. Additionally, the present invention can include a latching mechanism that achieves the desired spatial arrangement of the assembled parts. In general, guiding mechanisms can also place the assembled parts into the desired spatial arrangement by controlling the motion of a joint.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE PREFERRED EMBODIMENT

Figure 1:
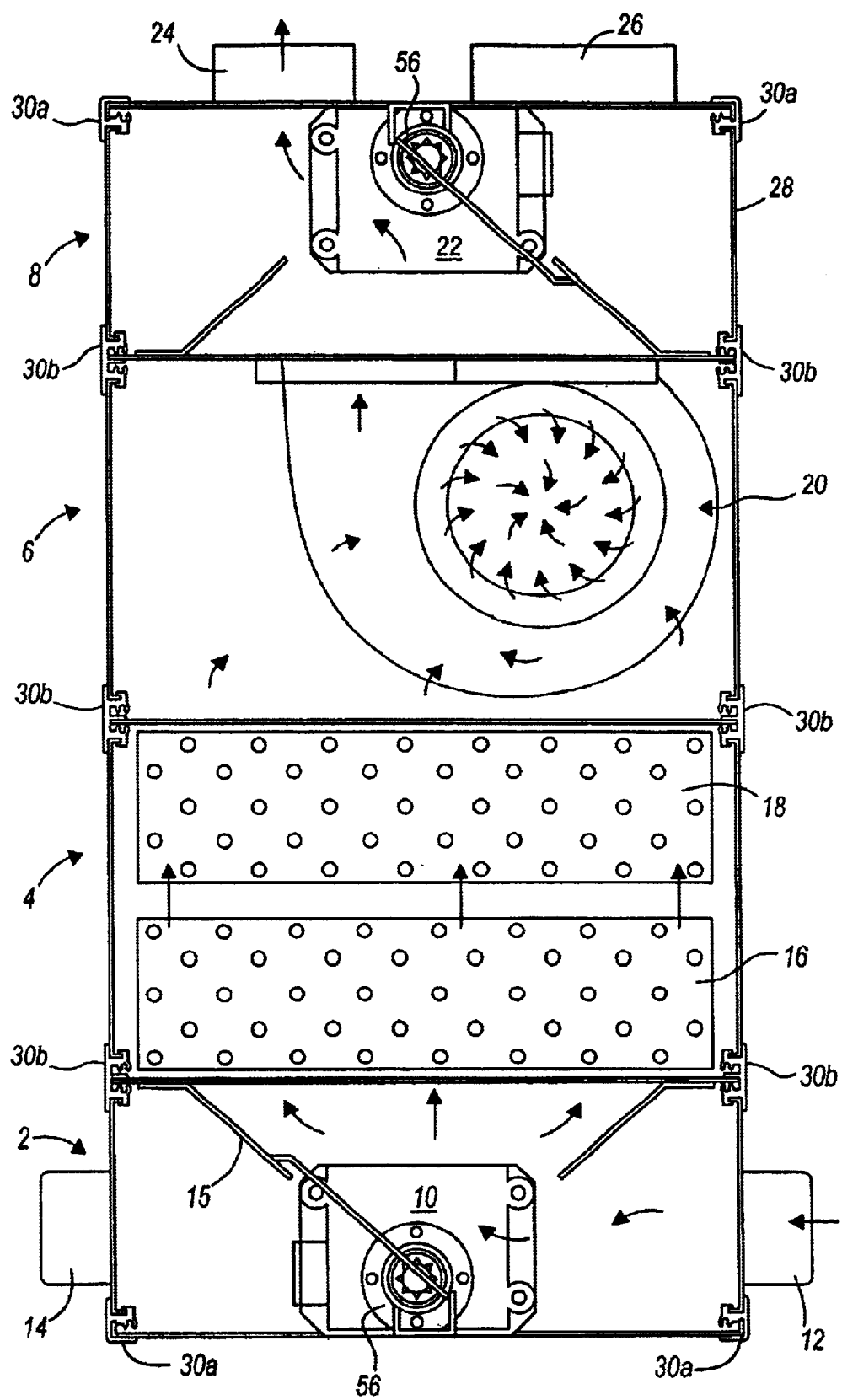
FIG. 1 is a plan view of an air conditioning unit embodying the present invention.
Figure 2:
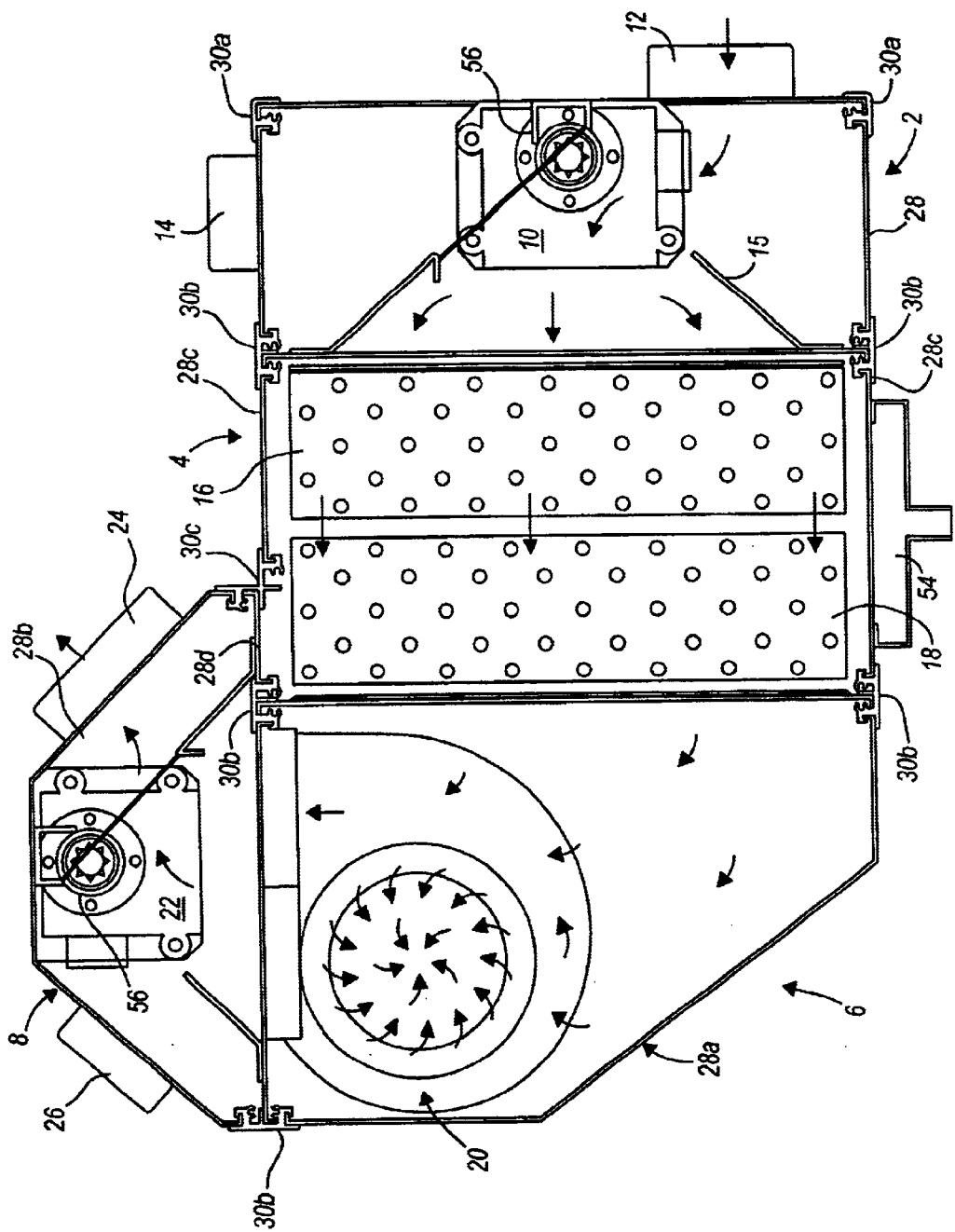
FIG. 2 is a plan view of an air conditioning unit according to an alternate construction.
Figure 4:
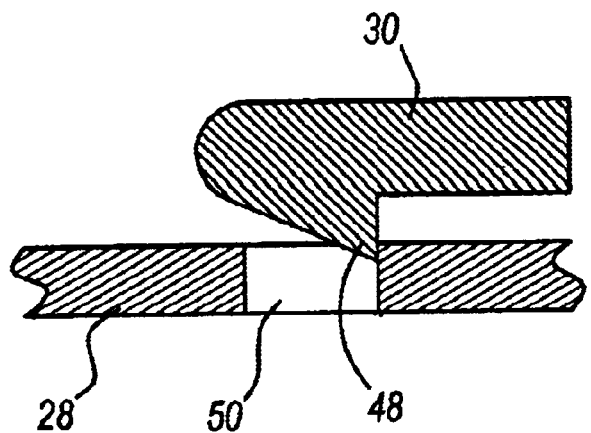
FIG. 4 is an enlarged side view of a connection between an edge strip and a wall section.

FIGS. 1 and 2 illustrate two alternate constructions of a temperature control unit, such as a commercial air conditioning unit 1, embodying the invention. The commercial air conditioning unit 1 shown in FIGS. 1 and 2 can be used to condition the load space of a number of different vehicles, including buses, trucks, semi-trailer tractors, agricultural vehicles, and the like. The constructions of the present invention shown in FIGS. 1 and 2 are substantially similar and include similar parts.

FIGS. 1 and 2 illustrate vertical constructions of the commercial air conditioning unit 1. In these constructions, the air conditioning units 1 can be installed vertically in a dashboard of a commercial vehicle in the manner shown in FIGS. 1 and 2. Alternatively, if an underfloor installation or installation in the ceiling is desired, the air conditioning unit 1 can be reconfigured and can be reoriented.

In FIGS. 1 and 2, arrows indicate the flow of air through the air conditioning unit 1. Air is drawn into the air conditioning unit 1 from the outside, is heated or cooled in the air conditioning unit 1 as desired and is then exhausted into the interior (e.g., load space) of the vehicle.

The air conditioning unit 1 includes four sequentially assembled modules 2, 4, 6, and 8. Air flows through modules 2, 4, 6, and 8 as indicated by the arrows. Module 2 includes a damper unit 10, which can be opened to admit fresh atmospheric air through an exterior intake nozzle 12. Alternatively, the damper unit 10 can be operated in a recycle mode and can be adjusted in such a way that air is draw into the damper unit 10 through intake nozzle 14. Similarly, the damper unit 10 can be adjusted so that fresh air from intake nozzle 12 and recycled air from intake nozzle 14 can be mixed in a predetermined ratio.

Air from module 2 enters a first end of module 4 through a channel (e.g., a guide funnel) 15. Module 4 includes two heat exchanger units 16 and 18, which are arranged axially and in succession. One of the heat exchanger units 16, 18 is a heating unit and the other is a cooling unit. In the constructions illustrated in FIGS. 1 and 2, heat exchanger 16 is a cooling unit and heat exchanger 18 is a heating unit. In this manner, if no cooling is necessary the heat exchanger 16 can operate as a dehumidifier to remove moisture from the air during heating operations, or alternatively, heat exchanger 16 can operate as a dehumidifier when neither heating nor cooling operations are required. In alternative constructions of the present invention (not shown), heat exchanger 18 can be a cooling unit and heat exchanger 16 can be a heating unit.

As shown in FIGS. 1 and 2, air exits a second end of module 4, passes through an unthrottled aperture, and into module 6, which houses a fan assembly 20. In various constructions, the fan assembly 20 can include a single radial fan, or alternatively, the fan assembly 20 can include a series of axially arranged radial fans (e.g. two radial fans). Referring again to FIGS. 1 and 2, the fan assembly 20 draws air into the air conditioning unit 1 through intake nozzle 12 and/or intake nozzle 14 and conveys the air forward to module 8. In other constructions (not shown), module 6 can be located between modules 2 and 4, and the fan assembly 20 can operate as a pressure blower.

Air exits module 6 through an unthrottled aperture and enters module 8, which includes a damper unit 22. In some constructions, the damper units 10, 22 can be substantially similar and may be interchangeable, or alternatively, in other constructions, the damper units 10, 22 can be substantially different.

Module 8 includes two exhaust nozzles 24, 26 that are located on the outside of module 8. In various configurations, air exiting the damper 22 can be selectively fed into one or both of the exhaust nozzles 24, 26. In particularly, as described above with respect to module 2, damper unit 22 can be adjusted as desired so that it only feeds exhaust air to exhaust nozzle 24, only feeds air to exhaust nozzle 26, or feeds air to both exhaust nozzles 24, 26 at the same time in a predetermined ratio.

Exhaust nozzle 24 can, for example, be used to air condition the driver side of a vehicle, and exhaust nozzle 26 can, for example, be used to air condition the passenger side of the vehicle. Similarly, one exhaust nozzle 24, 26 can be used to air condition one or both of the driver side and the passenger side, and the other exhaust nozzle 24, 26 can be used to keep the windshield of the cab clear. In other constructions (not shown), air from one or both of the exhaust nozzles 24, 26 can be used to air condition the rest of the vehicle (e.g., the load space of a truck or trailer, the rest of the passenger space of a bus, and the like).

As mentioned above, FIGS. 1 and 2 illustrate two constructions of the present invention. The differences between the two constructions are described hereafter. In the first construction (shown in FIG. 1), modules 2, 4, 6, and 8 are all arranged linearly. This arrangement is similar to conventional air conditioning units (not shown).

In the construction illustrated in FIG. 1, the two intake nozzles 12 and 14 are located on opposite vertical side walls of module 2 and the two exhaust nozzles 24 and 26 are located on the horizontal top side of module 8.

FIG. 2 illustrates a second construction of the present invention which is arranged differently from conventional air conditioning units. In the construction illustrated in FIG. 2, the three modules 2, 4, and 6 are arranged linearly, and module 8 is arranged above module 6 and above approximately half of the width of module 4. In other constructions, module 8 can also or alternately be arranged above module 6 or above module 4 and can extend further horizontally.

With respect to the construction illustrated in FIG. 2, intake nozzle 12 is located on the exposed vertical side wall of module 2 and intake nozzle 14 is located on the exposed upper horizontal top wall of module 2. Module 6 is chamfered at the bottom left in the plane of the drawing. Air flows horizontally into module 6 and the chamfered configuration of module 6 effectively redirects the flow of air vertically upward toward the fan assembly 20. Module 8 is pyramid-shaped, or as shown in FIG. 2 is trapezoidal-shaped. The longest side of module 8 forms a base and is arranged above the fan assembly 20 and the shortest side forms the uppermost portion of the air conditioning unit 1. The two exhaust nozzles 24 and 26 are located on the two angled surfaces that connect the longest and shortest sides.

Modules 2 and 4 are rectangularly shaped in the constructions illustrated in FIGS. 1 and 2. The constructions illustrated in FIGS. 1 and 2 also include the following similarities. Modules 2, 4, 6, and 8 include wall sections 28 which enclose interior spaces. As described above, a number of channels and apertures extend through the wall sections 28 and connect modules 2, 4, 6, and 8. Additionally, intake nozzles 12 and 14 as well as exhaust nozzles 24 and 26 are incorporated into the design of wall sections 28. The same applies for other elements described below.

In the constructions illustrated in FIGS. 1 and 2, modules 2, 4, 6, and 8 include edge strips 30, which extend parallel or at right angles to the length of the air conditioning unit 1, are parallel to one another, hold the wall sections 28 between one another, and form removable joint connections 32 (as explained in more detail below and illustrated in FIG. 3). As shown in FIGS. 1 and 2, the joint connections 32 define channels that extend into the plane of the figures. At places where modules feed into one another without a narrowing of cross sectional area (e.g., at the intersection of modules 4 and 6), the respective wall sections 28 can be entirely or partially left out.

The channels can be closed off by wall sections (not shown). Fasteners can removably connect the wall sections to the ends of the edge strips 30 (see reference number 52 in FIG. 3). It is possible to close off a number of these channel-type structures with a single covering wall section 28.

In the construction illustrated in FIG. 1, one edge strip 30 is located in each of the four corners of modules 2, 4, 6, and 8. Similarly, in the construction illustrated in FIG. 2, one edge strip 30 is located in each of the four corners of modules 2 and 4.

In the construction illustrated in FIG. 2, modules 6 and 8 do not have rectangular cross sections and therefore a smaller number of edge strips 30 are needed. More particularly, in the construction illustrated in FIG. 2, module 6 includes a wall section 28a having two bends, forming a horizontal section, a middle section, and a vertical section. The horizontal and vertical sections are coupled to edge strips.

In the construction illustrated in FIG. 2, module 8 includes a single wall section 28b forming a trapezoidal shape. Two sides of the wall section 28b are connected to edge strips 30. The wall section 28b also includes two exhaust nozzles 24 and 26.

Different shapes of edge strips 38 are provided depending on the arrangement of the wall sections 28. The present invention includes edge strips 30 having a number of different configurations, as described in greater detail below.

Figure 3:
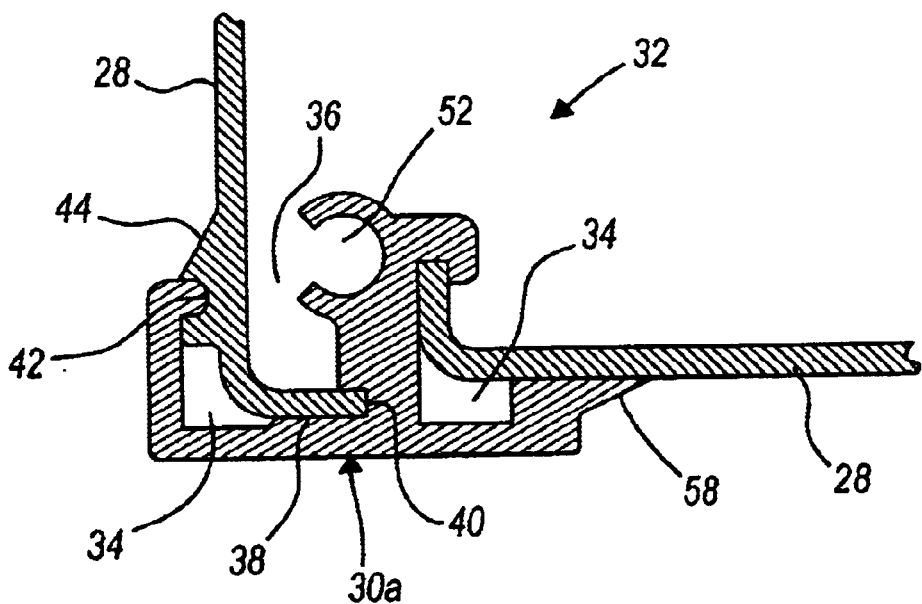
FIG. 3 is an enlarged plan view of a portion of the air conditioning unit of FIG. 1.

FIG. 1, 2, and 3 illustrate edge strips 30a that are operable to couple two wall sections 28 at a right angle to each other. Edge strips 30a are shown in FIG. 1 at the two lower corners of module 2 and at the two upper corners of module 8 and in FIG. 2 at the two right side corners of module 2.

A second type of edge strip 30b connects adjacent modules together and connects two wall sections 28 of a single module. This is the case in FIG. 1 between modules 2 and 4, modules 4 and 6, and modules 6 and 8, and in FIG. 2 between modules 2 and 4, modules 4 and 6, and modules 6 and 8.

A third type of edge strip 30c is shown in FIG. 2 on top of module 4. This edge strip 30c connects three different wall sections 28b, 28c, 28d that are arranged in three different directions and connects modules 4 and 8. In particular, edge strip 30c connects wall sections 28c and 28d that together form a portion of module 4 in the same manner as described above with respect to edge strips 30b. In addition, edge strip 30c connects module 8 to wall section 28b, which forms a portion of module 4.

In other constructions (not shown), the edge strips 30 can be arranged differently and can connect wall sections 28 at other angles (e.g., oblique angles). FIG. 3 illustrates edge strip 30a. The other types of edge strips (e.g., 30b and 30c) are substantially similar to edge strip 30a but have different orientations.

Edge strip 30a includes two undercut channels 34 each of which includes a longitudinal slit 36 for receiving a turned side 36 of adjoining wall sections 28. By making a hinging motion, the turned end 38 of the wall section 28 is engageable in an interior lateral notch 40 that is located at the base of the channel 34. At the same time, an external bulge 44 located on an external side of the wall sections 28 engages a notch 42. The arrangement is designed so that, in addition to the hinging motion described, the edge strip 30a can also be pushed axially into its final position. The edge strips 30 can be locked in a final position by snapping a latching hook 48 into corresponding latch holes 50 in the wall sections 28.

Edge stripes 30a (and edge strips 30, 30b, and 30c) also include axial recesses 52, which are part of an apparatus for connecting a covering wall section 28 to the air conditioning unit 1. The recesses 52 can accept either rivets or clamping pins or can be shaped as a threaded hole for receiving screws.

In the construction illustrated in FIG. 2, the lower wall section 28c includes a drainage channel for draining condensed water from the air conditioning unit 1. Module 4 of the first embodiment (shown in FIG. 1) can also include a similar channel.

In other constructions of the present invention (not shown), the damper units 10, 22 can be operated from outside the device. In these constructions, damping mechanisms similar to those described above can be used with identical activation mechanisms or other activation mechanisms can be used. In various constructions of the present invention, the activation mechanism or positioning device 56 can be either a manual positioning device or a positioning motor.

In other constructions of the present invention, the bulge 44 can include a notch 42 and a sealing strip 58 located between the wall section 28 and the undercut channel 34 of edge strip 30a.

What is claimed is:

1. A modular vehicle air conditioning unit comprising:
   a first module having a first wall section and a second wall section;

a second module;

a heat exchanger housed in one of the first module and the second module;

an airflow path extending through the first module and the second module and extending across the heat exchanger; and an edge strip removably coupling the first module and the second module and removably coupling the first wall section and the second wall section.

2. The modular vehicle air conditioning unit of claim 1, wherein the second module includes a third wall section and a fourth wall section, and wherein the edge strip removably couples the third wall section and the fourth wall section.

3. The modular vehicle air conditioning unit of claim 2, wherein the edge strip defines a first channel, a second channel, a third channel, and a fourth channel, and wherein the first channel is adapted to matingly receive the first wall section, the second channel is adapted to matingly receive the second wall section, the third channel is adapted to matingly receive the third wall section, and the fourth channel is adapted to receive the fourth wall section.

4. The modular vehicle air conditioning unit of claim 1, wherein the edge strip defines a first channel and a second channel, the first channel being at an angle relative to the second channel, and wherein the first wall section is engageable in the first channel and the second wall section is engageable in the second channel.

5. The modular vehicle air conditioning unit of claim 1, wherein the edge strip defines a channel, and wherein the first wall section includes a bend, the bend defining a short,segment and a long segment, the short segment being engageable in the channel.

6. The modular vehicle air conditioning unit of claim 5, wherein one of the long segment and the edge strip includes a protuberance, and wherein an other of the long segment and the edge strip defines an aperture, the protuberance being latchingly engageable in the recess.

7. The modular vehicle air conditioning unit of claim 1, wherein the first module defines an interior space, and further comprising a cover coupled to the edge strip and at least partially enclosing the first interior space.

8. The modular vehicle air conditioning unit of claim 1, wherein the first module includes a third wall section, and further comprising a second edge strip, the second edge strip removably coupling the first module and the second module and removably coupling the first wall section and the third wall section.

9. A modular vehicle air conditioning unit comprising:

a first module having a first wall section and a second wall section;

a second module adjacent to the first module;

a heat exchanger housed in one of the first module and the second module;

a fan housed in an other of the first module and the second module;

an airflow path extending through the first module and the second module and extending across the heat exchanger and the fan; and an edge strip removably coupling the first wall section and the second wall section.

10. The modular vehicle air conditioning unit of claim 9, wherein the edge strip removably couples the first module and the second module.

11. The modular vehicle air conditioning unit of claim 9, wherein the second module includes a third wall section and a fourth wall section, and wherein the edge strip removably couples the third wall section and the fourth wall section.

12. The modular vehicle air conditioning unit of claim 11, wherein the edge strip defines a first channel, a second channel, a third channel, and a fourth channel, and wherein the first wall section is matingly engageable in the first channel, the second wall section is matingly engageable in the second channel, the third wall section is matingly engageable in the third channel, and the fourth wall section is matingly engageable in the fourth channel.

13. The modular vehicle air conditioning unit of claim 9, wherein the edge strip defines a first channel and a second channel, the first channel being at an angle relative to the second channel, and wherein the first channel is adapted to removably receive the first wall section is moveably engageable in the first channel and the second wall section is matingly engageable in the second channel.

14. The modular vehicle air conditioning unit of claim 9, wherein the edge strip defines a channel, and wherein a first end of the first wall section includes a bend, the bend defining a short segment and a long segment, the short segment being engageable in the channel.

15. The modular vehicle air conditioning unit of claim 14, wherein one of the long segment and the edge strip includes a protuberance, and wherein the other of the long segment and the edge strip defines an aperture, the protuberance being latchingly engageable in the aperture.

16. The modular vehicle air conditioning unit of claim 9, wherein the first module defines an interior space, and further comprising a cover coupled to the edge strip, the cover and the first module at least partially enclosing the first interior space.

17. The modular vehicle air conditioning unit of claim 9, wherein the first module includes a third wall section, and further comprising a second edge strip, the second edge strip removably coupling the first wall section and the third wall section.

18. A method of assembling a modular vehicle air conditioning unit, the modular vehicle air conditioning unit including a first module having a. first wall section and a second wall section, a second module, a heat exchanger housed in one of the first module -and the second module, an air flow path extending through the first module and the second module-and across the heat exchanger, and an edge strip defining a first channel and a second channel, one of the first wall section and the edge strip having a first protuberance, an other of the first wall section and the edge strip having a first aperture, one of the second wall section and the edge strip having a second protuberance, an other of the second wall section and the edge strip having a second aperture, the method comprising:

inserting the first wall section into the first channel;

inserting the second wall section into the second channel;

latchingly engaging the first protuberance in the first aperture;

latchingly engaging the second protuberance in the second aperture; and coupling the first module and the second module.

19. The method of claim 18, wherein the air conditioning unit includes a cover, and wherein the method includes coupling the cover to the edge strip.

20. The method of claim 18, wherein inserting the first wall section into the first channel includes turning the first wall section in a first direction, and wherein latchingly engaging the first protuberance in the first aperture includes turning the first wall section in a second direction.

\* \* \* \* \*

UNITED STATES PATENT AND TRADEMARK OFFICE
CERTIFICATE OF CORRECTION

PATENT NO.    : 6,662,590 B2
DATED         : December 16, 2003
INVENTOR(S)   : Klaus Kamuf It is certified that error appears in the above-identified patent and that said Letters Patent is hereby corrected as shown below:

Column 7,
Line 31, "short," should be -- short --.

Column 8,
Line 42, "-and" should be -- and --.
Line 44, "module-and" should be -- module and --.

Signed and Sealed this

Second Day of March, 2004

JON W. DUDAS
*Acting Director of the United States Patent and Trademark Office*